United States Patent
Hegde et al.

(10) Patent No.: US 9,569,472 B2
(45) Date of Patent: Feb. 14, 2017

(54) SYSTEM AND METHOD FOR PROVIDING A SECOND LEVEL CONNECTION CACHE FOR USE WITH A DATABASE ENVIRONMENT

(71) Applicant: ORACLE INTERNATIONAL CORPORATION, Redwood Shores, CA (US)

(72) Inventors: Vidya Hegde, Bangalore (IN); Jean de Lavarene, Menlo Park, CA (US); Pankaj Chand, Bangalore (IN); Douglas Surber, Orinda, CA (US); Tong Zhou, Merrick, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 293 days.

(21) Appl. No.: 14/253,580

(22) Filed: Apr. 15, 2014

(65) Prior Publication Data
US 2015/0026405 A1    Jan. 22, 2015

Related U.S. Application Data

(60) Provisional application No. 61/847,986, filed on Jul. 18, 2013.

(51) Int. Cl.
*G06F 12/08* (2016.01)
*G06F 17/30* (2006.01)

(52) U.S. Cl.
CPC ......... *G06F 17/303* (2013.01); *G06F 12/0813* (2013.01); *G06F 12/0815* (2013.01);
(Continued)

(58) Field of Classification Search
CPC ............. G06F 17/30345; G06F 17/30566; G06F 17/30575; G06F 17/30587; G06F 17/30598; G06F 12/0813; G06F 12/0815; G06F 17/30902
See application file for complete search history.

(56) References Cited

U.S. PATENT DOCUMENTS

| | | |
|---|---|---|
| 6,338,089 B1 | 1/2002 | Quinlan |
| 7,174,539 B2 | 2/2007 | Dresselhaus |
| | (Continued) | |

FOREIGN PATENT DOCUMENTS

| | | |
|---|---|---|
| WO | 2006073865 | 7/2006 |
| WO | 2012037163 | 3/2012 |

OTHER PUBLICATIONS

DBA Administrators, "What is the difference between a connection and a session and how are they related?", 2 pages, retrieved Mar. 23, 2016 from: <http://dba.stackexchange.com/questions/13698/what-is-the-difference-between-a-connection-and-a-session>.

(Continued)

*Primary Examiner* — Chirag R Patel
(74) *Attorney, Agent, or Firm* — Tucker Ellis LLP

(57) ABSTRACT

Described herein is a system and method for providing a level 2 connection cache for use with a database environment. In accordance with an embodiment, a second level, or level 2 (L2), connection cache is used to cache no-session connections for use with a database. When a connection is requested, a no-session connection (NSC) can be retrieved from the cache and a database session is attached. Later, when the connection is closed, the database session is logged off and the no-session connection returned to the cache for subsequent use.

13 Claims, 6 Drawing Sheets

(52) U.S. Cl.
CPC .... *G06F 12/0868* (2013.01); *G06F 17/30345* (2013.01); *G06F 17/30902* (2013.01); *G06F 2212/465* (2013.01)

(56) References Cited

U.S. PATENT DOCUMENTS

| | | | |
|---|---|---|---|
| 7,257,625 B2 * | 8/2007 | Wu | G06F 17/30902 707/E17.12 |
| 7,978,544 B2 * | 7/2011 | Bernard | G06F 17/30572 365/189.07 |
| 9,229,993 B2 * | 1/2016 | Odenheimer | G06F 17/30557 |
| 2004/0088413 A1 | 5/2004 | Bhogi | |
| 2004/0098731 A1 | 5/2004 | Demsey | |
| 2005/0015411 A1 | 1/2005 | Altman | |
| 2005/0028164 A1 | 2/2005 | Neuwald | |
| 2005/0038801 A1 | 2/2005 | Colrain | |
| 2006/0143187 A1 | 6/2006 | Mukkamalla | |
| 2006/0143396 A1 * | 6/2006 | Cabot | G06F 12/121 711/134 |
| 2006/0146878 A1 | 7/2006 | Srivastava | |
| 2007/0136311 A1 | 6/2007 | Kasten | |
| 2008/0052370 A1 | 2/2008 | Snyder | |
| 2009/0064199 A1 | 3/2009 | Bidelis et al. | |
| 2009/0094589 A1 | 4/2009 | Gupta | |
| 2009/0282369 A1 | 11/2009 | Jones | |
| 2010/0322255 A1 | 12/2010 | Hao | |
| 2011/0154329 A1 | 6/2011 | Arcese | |
| 2011/0218981 A1 | 9/2011 | Retnakumari | |
| 2012/0066363 A1 | 3/2012 | Somogyi | |
| 2012/0096134 A1 | 4/2012 | Suit | |
| 2012/0136602 A1 | 5/2012 | Hossain | |
| 2012/0166483 A1 | 6/2012 | Choudhary | |
| 2012/0233407 A1 * | 9/2012 | Choi | G06F 12/0895 711/122 |
| 2012/0278293 A1 | 11/2012 | Bulkowski | |
| 2012/0281706 A1 | 11/2012 | Agarwal | |
| 2013/0091153 A1 | 4/2013 | Gitelman | |
| 2013/0117289 A1 | 5/2013 | Fischer | |
| 2013/0124807 A1 | 5/2013 | Nielsen | |
| 2013/0144984 A1 | 6/2013 | Zhao | |
| 2013/0290249 A1 | 10/2013 | Merriman | |
| 2014/0129592 A1 * | 5/2014 | Samudrala | G06F 21/60 707/783 |

OTHER PUBLICATIONS

Anonymous, Database Connection Pool Management, Research Disclosure, Dec. 1, 1998, 3 pages, vol. 41, No. 416, Mason Publications, Hampshire, GB.
International Searching Authority at the European Patent Office, International Search Report and Written Opinion for PCT International Patent Application No. PCT/US2014/035187, Aug. 5, 2014, 11 pages.
United States Patent and Trademark Office, Office Action Dated Jul. 29, 2016 for U.S. Appl. No. 14/202,348, 15 Pages.
United States Patent and Trademark Office, Office Action Dated May 19, 2016 for U.S. Appl. No. 14/251,410, 16 Pages.

* cited by examiner

SYSTEM AND METHOD FOR PROVIDING A SECOND LEVEL CONNECTION CACHE FOR USE WITH A DATABASE ENVIRONMENT

CLAIM OF PRIORITY

This application claims the benefit of priority to U.S. Provisional Patent Application titled "SYSTEM AND METHOD FOR PROVIDING A LEVEL 2 CONNECTION CACHE FOR USE WITH A DATABASE ENVIRONMENT", Application No. 61/847,986, filed Jul. 18, 2013, which application is incorporated herein by reference.

CROSS-REFERENCE TO RELATED APPLICATIONS

This application is related to the following U.S. Patent Applications, each of which applications is incorporated herein by reference: U.S. Patent Application titled "SYSTEM AND METHOD FOR CONNECTION LABELING FOR USE WITH CONNECTION POOLS", application Ser. No. 13/912,086, filed Jun. 6, 2013; U.S. Patent Application titled "SUPPORT FOR CLOUD-BASED MULTI-TENANT ENVIRONMENTS USING CONNECTION LABELING", application Ser. No. 13/912,098, filed Jun. 6, 2013; U.S. Patent Application titled "SYSTEM AND METHOD FOR PROVIDING A SHARABLE GLOBAL CACHE FOR USE WITH A DATABASE ENVIRONMENT", application Ser. No. 14/253,573, filed Apr. 15, 2014, 2014; U.S. Patent Application titled "EFFICIENT STORAGE AND RETRIEVAL OF FRAGMENTS FRAGMENTED DATA USING PSEUDO LINEAR DYNAMIC BYTE ARRAY", application Ser. No. 14/259,499, filed Apr. 23, 2014, 2014; U.S. Patent Application titled "SYSTEM AND METHOD FOR MARSHALING MASSIVE DATABASE DATA FROM NATIVE LAYER TO JAVA USING LINEAR ARRAY", application Ser. No. 14/251,410, filed Apr. 11, 2014; U.S. Patent Application titled "SYSTEM AND METHOD FOR TRANSPARENT MULTI KEY-VALUE WEIGHTED ATTRIBUTED CONNECTION USING UNI-TAG CONNECTION POOLS", application Ser. No. 14/202,348, filed Mar. 10, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases, and connection pools, and are particularly related to a system and method for providing a connection cache for use with a database environment.

BACKGROUND

Generally described, a connection pool is a cache of database connection objects. The connection objects represent physical database connections that can be used by a software application to connect to a database. At runtime, an application can request a connection from the pool. If the pool contains a connection that can satisfy the request, it returns the connection to the application. If no connections are found, a new connection can be created and returned to the application. The application uses the connection to access the database to perform work, and then returns the connection to the pool. The connection can then be made available for subsequent connection requests.

Creating connections can be costly both in terms of time and resources. For example, tasks such as network communication, authentication, transaction enlistment, and memory allocation all contribute to the amount of time and resources it takes to create a connection object. Connection pools allow reuse of such connection objects, and reduce the number of times that objects must be created.

One example of a connection pool is Oracle Universal Connection Pool (UCP), which provides a connection pool for caching JDBC connections. Java applications that are database-intensive can use the connection pool to improve performance and utilization of system resources. A UCP connection pool can use any JDBC driver to create physical connections that are then maintained by the pool. The connection pool can be configured with properties that are used to optimize pool behavior, based on the performance and availability requirements of an application.

SUMMARY

Described herein is a system and method for providing a level 2 connection cache for use with a database environment. In accordance with an embodiment, a second level, or level 2 (L2), connection cache is used to cache no-session connections for use with a database. When a connection is requested, a no-session connection (NSC) can be retrieved from the cache and a database session is attached. Later, when the connection is closed, the database session is logged off and the no-session connection returned to the cache for subsequent use.

DETAILED DESCRIPTION

Figure 1:
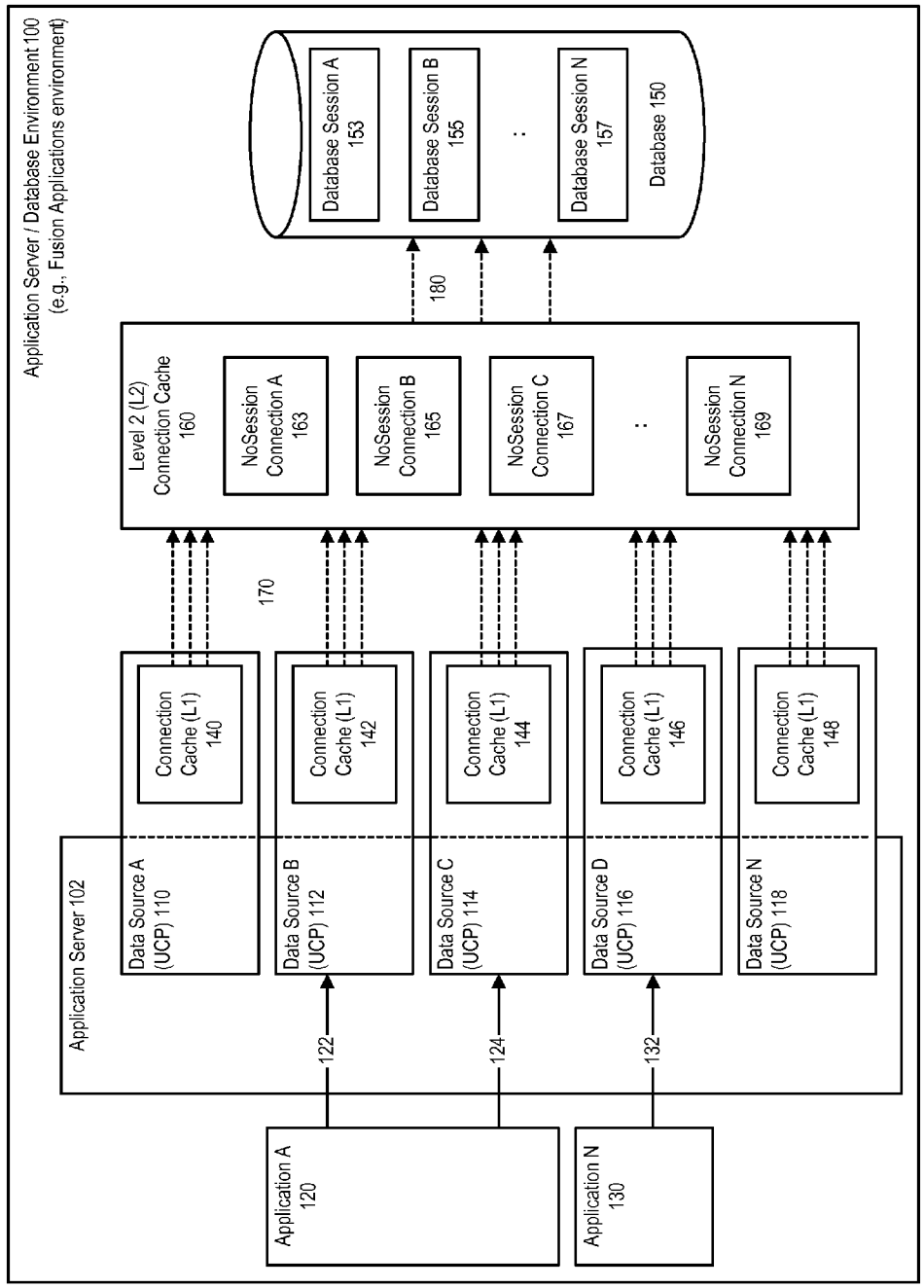
FIG. 1 illustrates a system for providing a level 2 connection cache for use with a database environment, in accordance with an embodiment.

As generally described above, a connection pool is a cache of database connection objects. The connection objects represent physical database connections that can be used by a software application to connect to a database. At runtime, an application can request a connection from the pool. If the pool contains a connection that can satisfy the request, it returns the connection to the application. If no connections are found, a new connection can be created and returned to the application. The application uses the connection to access the database to perform work, and then returns the connection to the pool. The connection can then be made available for subsequent connection requests. However, creating connections can be costly both in terms of time and resources.

Described herein is a system and method for providing a level 2 connection cache for use with a database environment. In accordance with an embodiment, a second level, or level 2 (L2), connection cache is used to cache no-session connections for use with a database. When a connection is requested, a no-session connection (NSC) can be retrieved from the cache and a database session is attached. Later, when the connection is closed, the database session is logged off and the no-session connection returned to the cache for subsequent use.

Second Level (Level 2) Connection Cache

In an environment that provides access to a database via a connection pool, each of a plurality of connections can be associated with their own connection cache. Typically, data source connection caches are sized so that a reasonable percentage of their connections (e.g., 50%) are likely to be available at any point in time, to accommodate occasional spikes.

As an illustrative example, in a particular embodiment of a system, 5 data sources might be associated with connection caches that allow for 100 connections each (i.e., a total of 500 maximum connections), of which it is expected that about 250 connections are likely to be available at any point in time.

However, each connection will be associated with a database session at the database, which is held in RAM memory and can be sizeable (e.g., 1 to 2 Mb each). Since only a portion of the connections may be active at any particular time, the above setup can result in a high number of unnecessary, inactive, database sessions being held in RAM at the database. This leads to poor scalability, particularly in complex, e.g., multi-tenant cloud environments that utilize a database.

Previous approaches have generally been directed to reducing the overall size of the connection cache for each data source, and/or using data source queues. However, these approaches do not substantially reduce the total number of inactive database sessions.

In accordance with an embodiment, described herein is a second level, or level 2 (L2), connection cache, that can be used to cache no-session connections for use with a database.

When a connection is requested, a no-session connection can be retrieved from the cache and a database session is attached. Later, when the connection is closed, the database session is logged off and the no-session connection returned to the cache for subsequent use. In accordance with an embodiment, when a database session is logged off, it can be closed immediately.

Since the total number of inactive database sessions can be reduced, performance at the database is improved. The number of data sources can also be increased, which can enhance the ability of the system to support a larger number of applications at the application tier. The system is particularly useful in environments in which many tenants are to be hosted on a single machine.

In accordance with an embodiment, an application server connection pool (e.g., Oracle UCP) can be configured to support a cache of no-session connections, each of which can be a JDBC or similar connection that is detached from its corresponding database session. In accordance with an embodiment, a JDBC driver can be configured to allow creation of a no-session connection without any attached database session, and, in response to requests from a connection cache, attach a database session on this connection. A universal connection pool (UCP) can leverage this to create an L2 connection cache of no-session connections at pool startup.

In accordance with an embodiment, when a user application requests a connection to the database, via a data source, the UCP can select a previously-created no-session connection from its L2 connection cache, and allow the JDBC driver to attach a database session for a user of the application. Later, when the connection is closed, only the database session is logged off. The resultant no-session connection can then be returned to the L2 connection cache.

Generally, when a system creates a typical JDBC connection, approximately 80% of the time is spent in creating a no-session connection (primarily creating a network link with protocol negotiation), while the remaining 20% of the time is spent in creating the actual database session, including user authentication. As such, the ability to cache and reuse no-session connections provides a significant performance gain.

As an illustrative example, in the above-described scenario which uses 5 data sources, in accordance with an embodiment, an L2 connection cache can be configured with 500 connections, 250 of which are no-session connections that are relatively inexpensive to maintain. This setup ensures that the same 500 maximum number of cached connections can be provided as before, together with a greater number of data sources, but with a reduced likelihood of inactive database sessions at the database.

In accordance with an embodiment, the system can perform a process similar to that illustrated by the pseudocode provided in Listing 1. In accordance with other embodiments and implementations, other approaches can be used.

Listing 1

```
GetConnection > Connection
If available connection in L1
Return it
Else (a) call 12.getconnection .NSC
    (b) NSC.beginSession
    (c) return
Connection.close( )
If room in L1 cache
Store it in L1
Else call connection.endsession( ) > NSC
NSC.close > L2
```

As illustrated in Listing 1, in accordance with an embodiment, when receiving a request for a database connection, a data source first checks its associated L1 connection cache for an idle connection. If no idle connection is found, the data source can check for an available no-session connection from the L2 connection cache, and start or attach a database session to the no-session connection. The resultant connection can then be returned to the requesting application.

As further shown in Listing 1, in accordance with an embodiment, when the application closes the connection, the system can store the connection in the L1 connection cache if there is available capacity therein to store the connection. If there is no capacity left in the L1 cache, the database session can be stopped or detached from the connection, and the resultant no-session connection can be stored in the L2 connection cache for future use.

System for Providing an L2 Cache

FIG. 1 illustrates a system for providing a level 2 connection cache for use with a database environment, in accordance with an embodiment.

As shown in FIG. 1, an application server or database environment 100, such as an Oracle Fusion Applications environment, can include or provide access to a database 150. As further shown in FIG. 1, the system can include an application server 102, and data sources 110, 112, 114, 116, and 118, wherein each data source can include a level 1 (L1) or data source connection cache, 140, 142, 144, 146, and 148, respectively.

In accordance with an embodiment, each L1 connection cache can provide a plurality of connections 170 to the database. Software applications (for example, applications A 120 and N 130) can request database connections from the data sources. For example, each of the L1 connection caches can include a plurality of database connections, each of which connects 180 the associated data source with the database. Some of the connections may be active and being used to connect to the database, while others of the connections may be inactive and idle.

In accordance with an embodiment, the L2 connection cache 160 can include a plurality of no-session connections, indicated here as 163, 165, 167, and 169. For example, each no-session connection can be a Java Database Connectivity (JDBC) connection, or other type of connection. As described above, a no-session connection can be an idle connection, with no database session attached thereto. The system can then attach a database session, e.g., 153, 155 or 157, to a no-session connection.

In accordance with an embodiment, a connection pool can be configured to manage the no-session connections in the L2 connection cache, including attaching a database session to a no-session connection when required. After attaching, the no-session connection can become a complete connection (i.e., with an attached session), and can be utilized in the same manner as a regular database session connection.

A connection with a database session can be detached from its session. When this occurs, the connection can become a no-session connection, and can be stored in the L2 connection cache, for subsequent use.

In accordance with an embodiment, a connection between an application and the database can be established as follows: The application can first request a database connection from a data source. The data source can, in turn, attempt to locate an available database connection from its associated L1 connection cache. If a connection is available, the data source can retrieve the connection and return it to the requesting application, which can then use the returned connection to interact with the database.

In accordance with an embodiment, in order to attach or log a no-session connection to a database session, a user name and password can be authenticated. Other forms of authentication can also be implemented. In accordance with an embodiment, the L1 connection caches, and the L2 connection cache, can be contained within and managed by a single, global connection pool.

As an illustrative example, in accordance with an embodiment, the system can perform a process similar to that illustrated by the pseudocode below.

Listing 2

```
Connection getConnection( )
IF available connection in (L1cache)
    THEN return L1cache.retrieveConnection( )
    ELSE NSC=L2cache.retrieveConnection( )
        NSC.beginSession( )
        Return NSC
```

As illustrated in Listing 2, in accordance with an embodiment, an interface is provided on both an L1 connection cache and the L2 connection cache, so that a connection can be retrieved from the caches.

As further shown in Listing 2, in accordance with an embodiment, in the event that there are no available connections in the L1 connection cache, the data source can locate an available no-session connection from the L2 connection cache, and start or attach a database session to the no-session connection. The connection can then be returned to the application.

In the event that neither the L1 nor the L2 connection cache can provide an available connection, then a new database connection can be created and returned to the requesting application.

In accordance with an embodiment, to create a new connection, the previously-described steps used to create a new no-session connection can be performed first, including establishing a transmission control protocol connection to the database listener on the server by opening a socket on the database server; and performing network session negotiations between the client and the server. The session negotiation can include security, encryption, and checksumming negotiations; and two-task common negotiations wherein the client and server can exchange and agree on the way they will represent two-task common structures. After these steps, a no-session connection (i.e., a connection not currently attached to any database session) is established. Then, a new database session can be started at the no-session connection, and a fully functional database connection established and provided to the requesting application.

In accordance with an embodiment, an application can return a connection to be closed. To close a connection, the connection can first be inactivated or marked idle. The associated data source can then check for available capacity in the L1 connection cache for storing the connection. If there is no capacity left in the L1 cache, the database session can be stopped and detached from the connection, and the resultant no-session connection can be stored in the L2 connection cache, for future use.

As an illustrative example, in accordance with an embodiment, the system can perform a process similar to that illustrated by the pseudocode below.

Listing 3

```
CloseConnection(Connection)
IF available room in (L1cache)
    THEN L1cache.storeConnection(Connection)
    ELSE NSC=Connection.endSession( )
        L2cache.storeConnection(NSC)
```

As illustrated in Listing 3, in accordance with an embodiment, the system can check an L1 connection cache for available space in which to store a connection that is to be closed, and store the connection therein if there is available room. The system can also stop a database session on the connection and store the corresponding no-session connection in the L2 connection cache.

In accordance with an embodiment, an active connection can be actively used at a data source, while being contained within or outside of a connection cache. A database session can be attached at each active connection, allowing an application manipulating a data source to be connected to the database.

In accordance with an embodiment, an active connection may reside in an L1 connection cache, or in an L2 connection cache, or alternatively not in any cache. There may exist idle connections within the L1 connection cache associated with a data source, and there may exist idle no-session connections within the L2 connection cache. After putting an idle connection in a cache into active use, the connection can remain within its cache.

As an illustrative example, as shown in FIG. 1, the application 120 can utilize the database 150 while connected to a data source 110 on the application server 102. Connection pools can manage connections contained within the L1 connection cache, connections contained within the L2 connection cache, and connections not within any cache.

At the time of closing the connection, a first determination can be made as to the availability of the L1 connection cache. If there remains available capacity at the L1 connection cache associated with the data source, the connection can be stored in the L1 connection cache. Optionally, an idle connection can remain connected to a database session while stored in the L1 connection cache. If, instead, there is no space to store the connection at the L1 connection cache, then the session on the connection ends, and the connection can be then stored in the L2 connection cache as a no-session connection.

L2 Cache Startup and Usage

Figure 2:
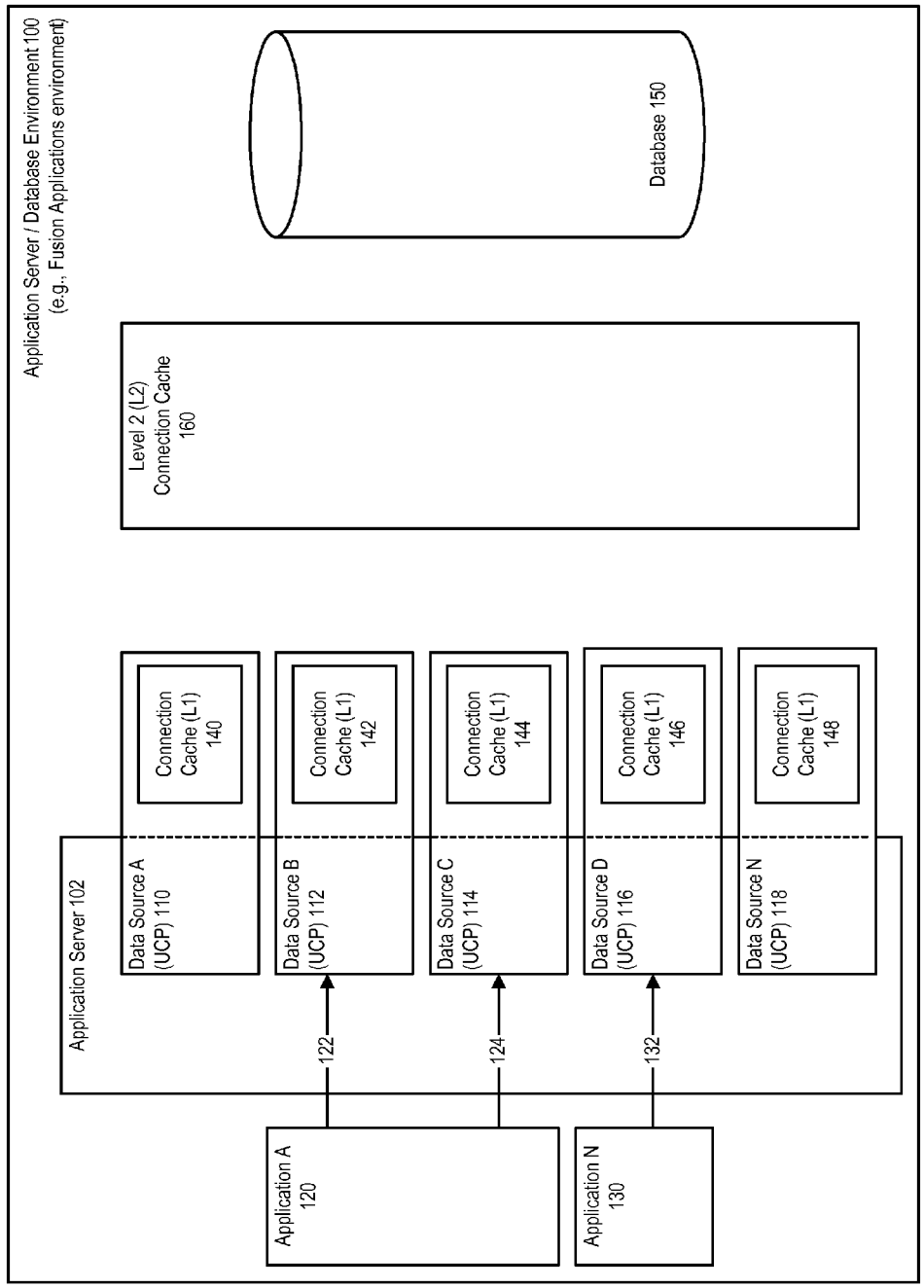
FIG. 2 further illustrates the system of FIG. 1 when the system is first started, in accordance with an embodiment.

FIG. 2 further illustrates a system of FIG. 1 when the system is first started, in accordance with an embodiment. As shown in FIG. 2, when the system is first started, the L1 connection caches and the L2 connection cache can be created without any connections cached therein. In accordance with an embodiment, the database may not contain any database session associated with a user of the applications.

In accordance with an embodiment, the sizes of the L1 connection caches and L2 connection cache can be static. In accordance with an embodiment, the sizes of the L1 connection caches typically are small, e.g., ranging from 1 to 5 connections, and the L2 connection cache, which is shared by the L1 connection caches, can be much larger in size, so that a sufficient number of no-session connections are cached therein to accommodate peaks of connection requests.

This approach of using and sizing the two-level caches is particularly useful in an environment where a large number of database sources are needed for scalability, such as a cloud and multi-tenancy environment, and can reduce the number of inactive database sessions, thus improving the performance of the database.

Figure 3:
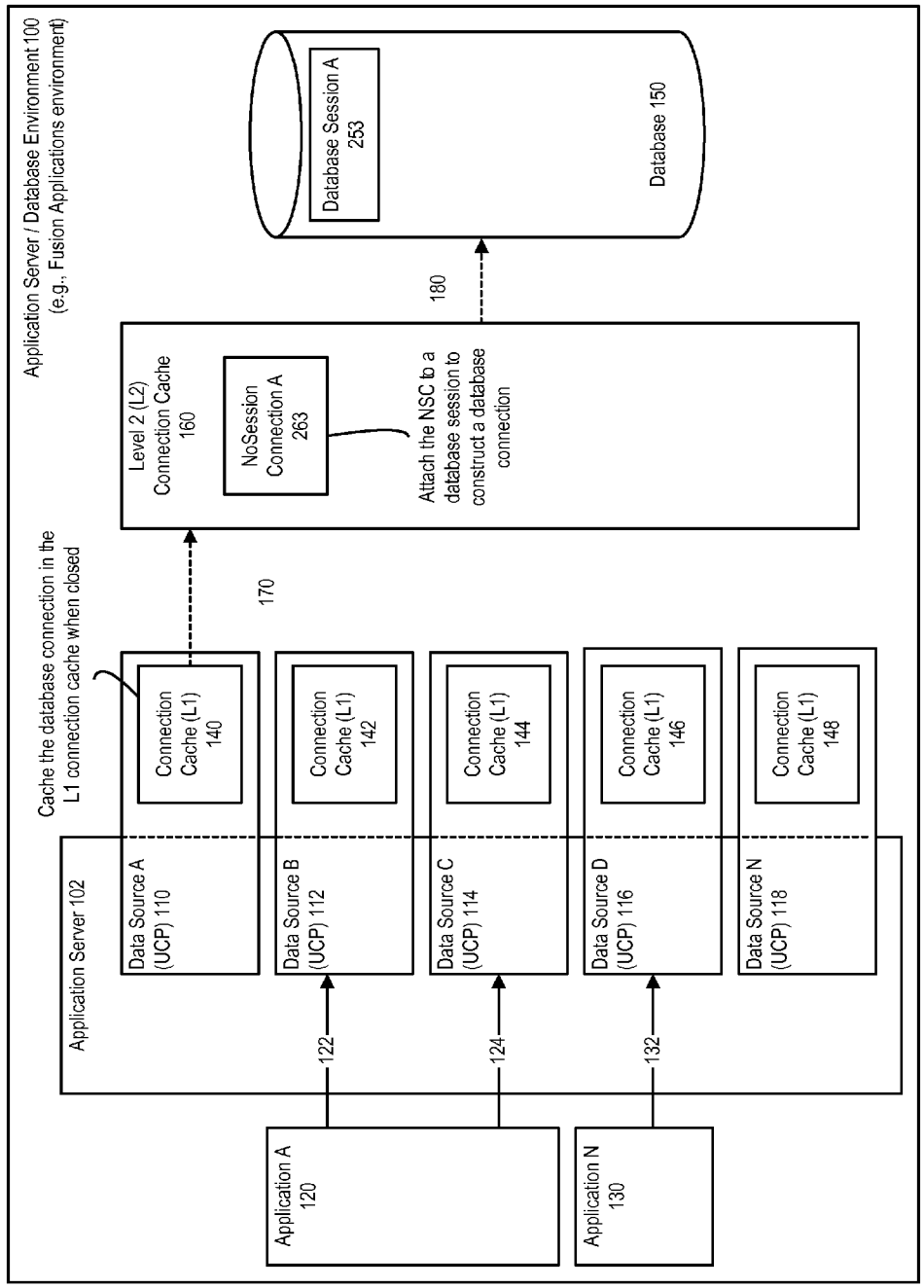
FIG. 3 further illustrates a system for providing a level 2 connection cache for use with a database environment, in accordance with an embodiment.

FIG. 3 further illustrates a system for providing a level 2 connection cache for use with a database environment, in accordance with an embodiment.

In accordance with an embodiment, when a request for a database connection is received from a user application via a data source 110, the data source can determine that the L1 connection cache associated with the data source and the L2 connection cache are both empty. In accordance with an embodiment, the data source can create a no-session connection 263, attach it to a new database session 253, and return the fully functional connection to the user application.

In accordance with an embodiment, when the user application returns the database connection to be closed, the connection can be marked idle and stored in the L1 connection cache.

Figure 4:
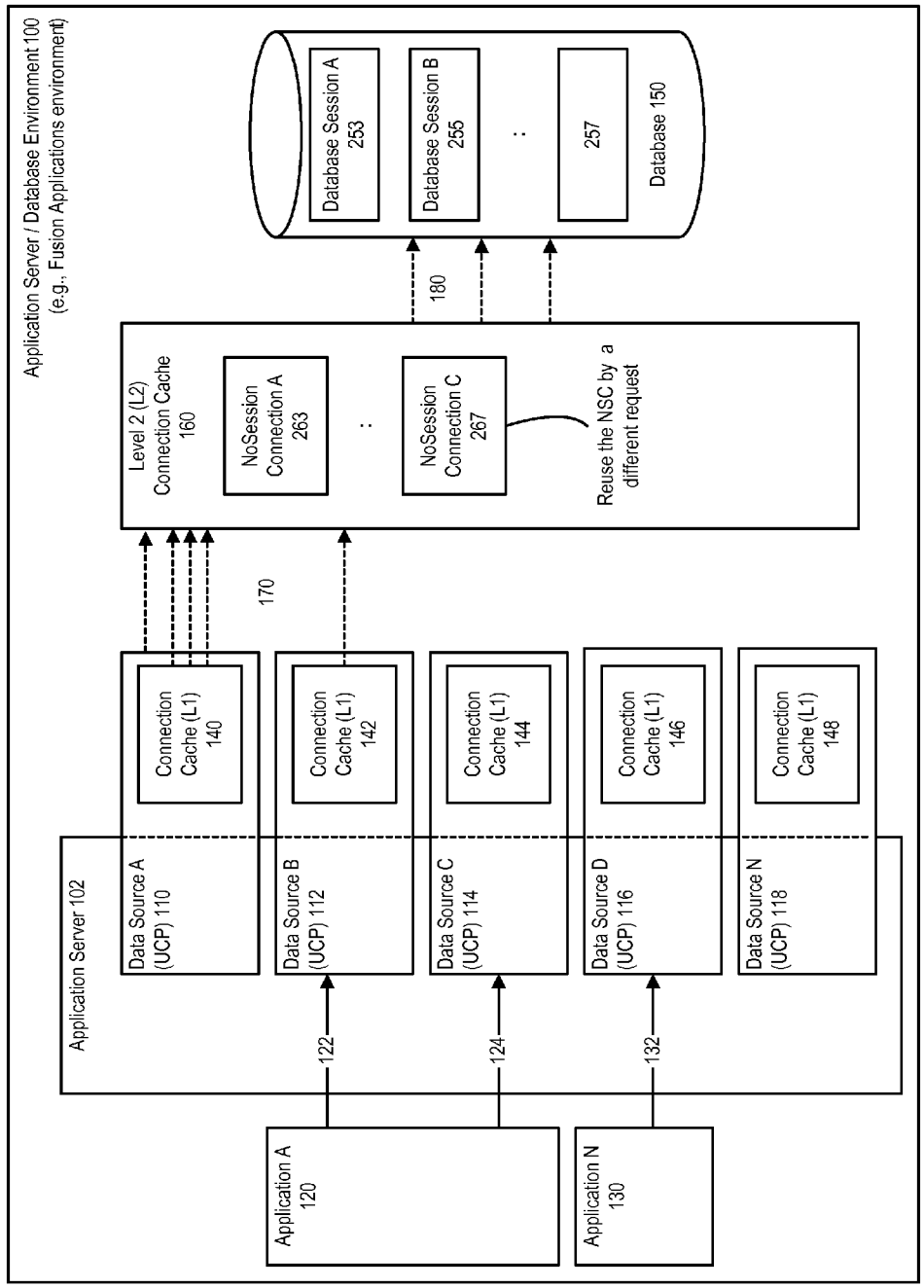
FIG. 4 further illustrates a system for providing a level 2 connection cache for use with a database environment, in accordance with an embodiment.

FIG. 4 further illustrates a system for providing a level 2 connection cache for use with a database environment, in accordance with an embodiment.

In accordance with an embodiment, as the system continues receiving requests for database connections from the applications and storing database connections returned from the applications in the L1 connection cache 140, the L1 connection cache, which is static in size, may have no empty slot left for storing any additional connection.

In accordance with an embodiment, in the above-described scenario, if another database connection is returned to be closed at the data source from an application, the system can detach the database connection from its associated database session such as 257, and return the detached no-session connection (NSC), e.g., 267, to the L2 connection cache for subsequent use by a different request, either from the same data source or a different data source such as the data source 112.

In accordance with an embodiment, detaching means disassociating or removing an associated database session from a no-session connection.

In accordance with an embodiment, after a database session is detached from a no-session connection, the database session can be cleared immediately from the RAM or retained for the duration of an associated web session. In accordance with an embodiment, keeping the lifetime of a database session the same as that of the associated web session can expedite logging on to the database session for a subsequent connection request from a same user, which results in a faster response time for the user.

In an accordance with an alternative embodiment, the lifetime of a database session can be much shorter than the web session, so as to avoid using hundreds of thousands database sessions, particularly when the application is a large enterprise application with a large number of concurrent users.

In accordance with an embodiment, in the case where the next database session has the same credentials (same user) with the existing database session, information such as the statement descriptions can be kept. However, if the next database session is opened by a different user, a cleanup of the existing database session can be performed to reduce the number of inactive/detached database sessions in the database.

Method for Providing an L2 Cache

Figure 5:
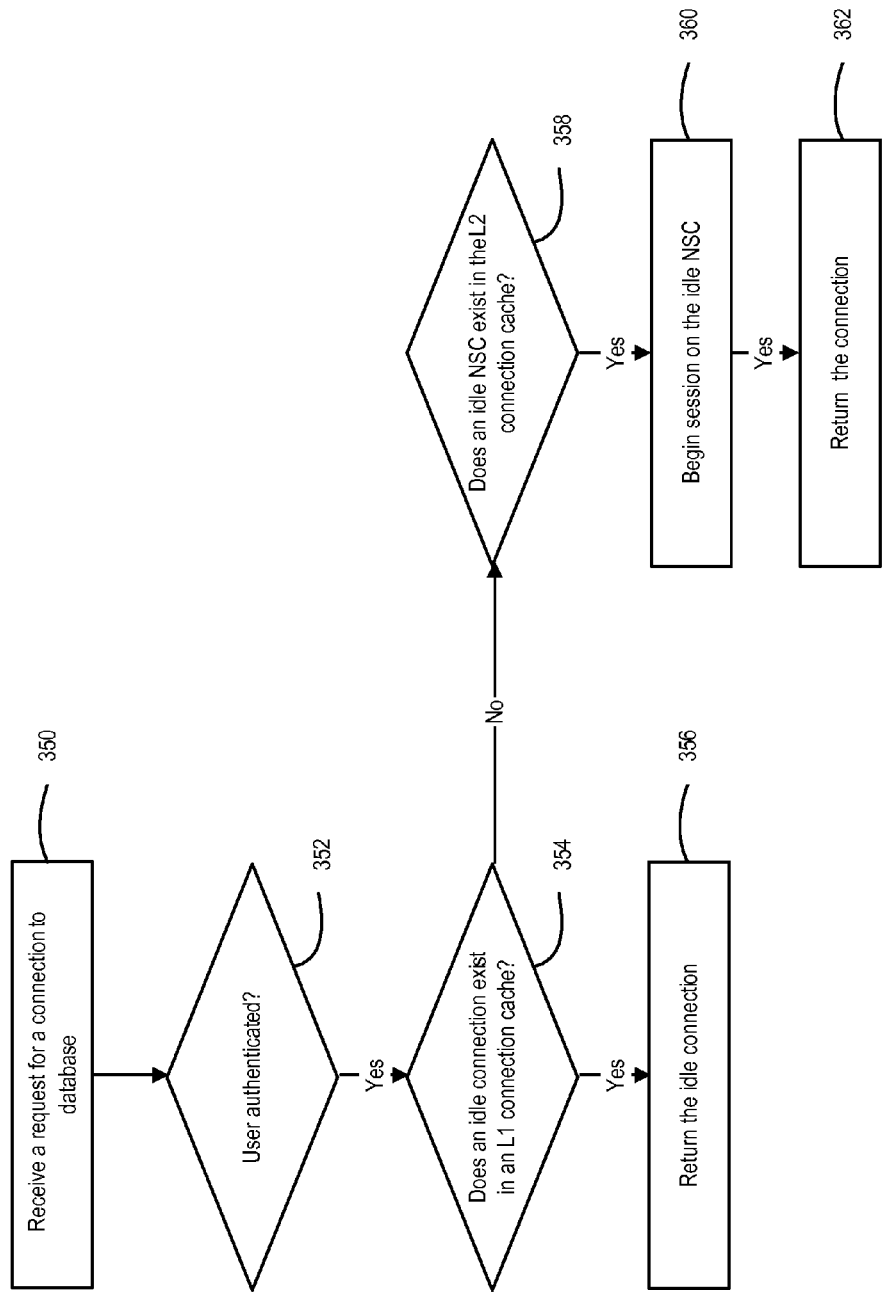
FIG. 5 is a flowchart that illustrates a method for providing a level 2 connection cache for use with a database environment, in accordance with an embodiment.

FIG. 5 is a flowchart that illustrates a method for providing a level 2 connection cache for use with a database environment, in accordance with an embodiment.

As shown in FIG. 5, in accordance with an embodiment, at step 350, the system receives a request for a connection to the database.

At step 352, a user making the request can be first authenticated using a security measure such as user name and password.

Next, at step 354, the system can determine if there is an available connection in the L1 connection cache.

At step 356, the available connection from the L1 connection cache can be returned.

At step 358, the system has determined that there is no available connection in the L1 connection cache, and subsequently the system can determine whether an idle no-session connection is available in the L2 connection cache.

At step 360, the system starts a database session on an available no-session connection.

At step 362, the fully functional connection is returned to the user application.

In accordance with an embodiment, if there is no available no-session connection in the L2 connection cache, at step 358, a connectivity driver, such as the JDBC driver, can create a new connection for use by a requesting application. Optionally, in accordance with an embodiment, no-session connections can be created at various points, such as during initial system boot-up.

The above describes one approach to storing, and retrieving, and managing connections utilizing an L2 connection cache with no-session connections.

Figure 6:
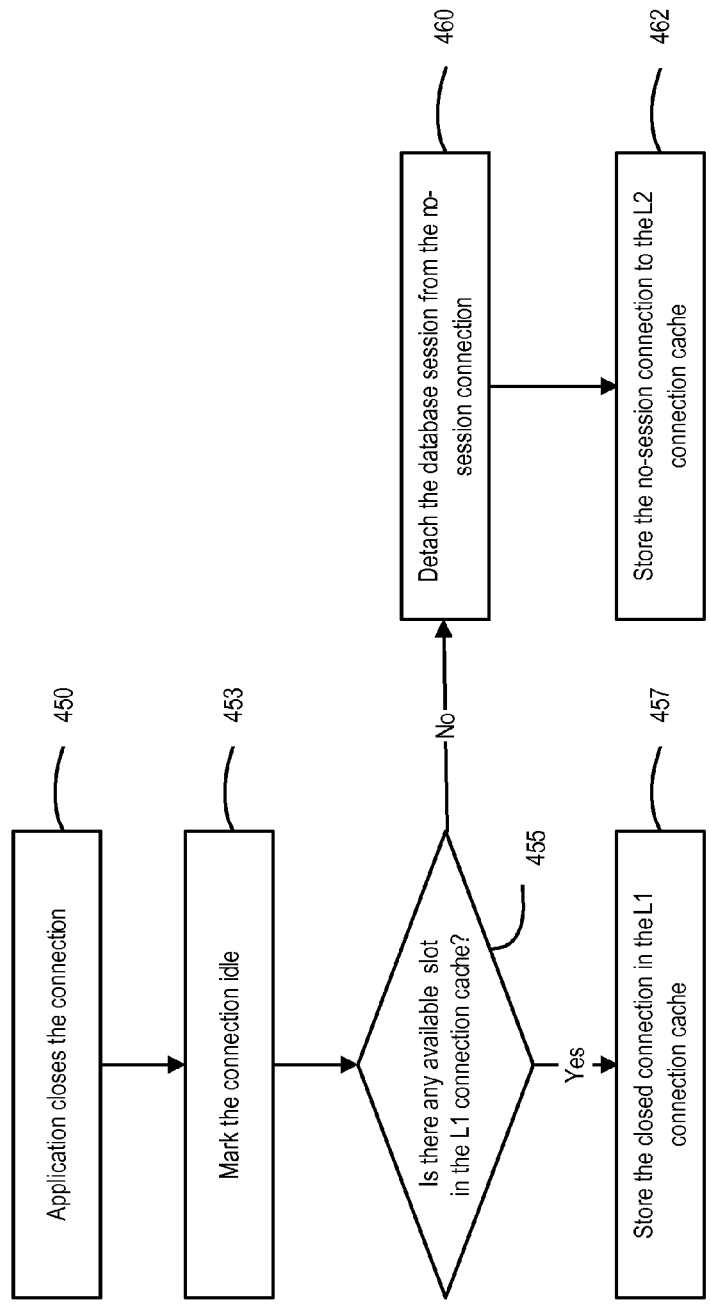
FIG. 6 is a flowchart that further illustrates a method for providing a level 2 connection cache for use with a database environment, in accordance with an embodiment.

FIG. 6 is a flowchart that further illustrates a method for providing a level 2 connection cache for use with a database environment, in accordance with an embodiment.

In accordance with an embodiment, at step 450, the application returns a database connection to be closed.

At step 453, the connection can first be inactivated or marked idle.

At step 455, the system can check for an available slot in the L1 connection cache for storing the connection.

At step 457, the connection can be passed to the L1 connection cache to be stored therein.

At step 460, the connection is detached from its associated database session.

At Step 462, the resultant no-session connection can be stored in the L2 connection cache for future use.

In accordance with an embodiment, functionalities can be provided for use in a JDBC-driven environment. Because a no-session connection in an L2 connection cache can be used with any one of a plurality of data sources, this allows the total number of inactive sessions to be reduced. In turn, demand on the amount of RAM at the database is also reduced.

Example Implementations for L2 Cache

Provided below are illustrative examples of a system for providing a level 2 connection cache for use with a database environment, in accordance with an embodiment.

Environments such as Oracle UCP provide the ability to create a Level 2 connection cache of no-session connection, and a plurality of L1 connection caches at pool startup. Each type of cache has an interface getConnection( ) that returns a regular database session connection, or a no-session connection.

In accordance with such implementations, the JDBC driver package can be configured to create these no-session connections. In accordance with an embodiment, a connection property "oracle.jdbc.NoSessionConnection" can be added to the JDBC driver package and can be set to true if a no-session connection is to be created. In accordance with an embodiment, no-session connection can be created at boot time.

In accordance with an embodiment, the "oracle.jdbc.internal.OracleConnection" object can be modified to add an "openSession( )", a "closeSession( )", and a "getState( )" method, as illustrated below:

Listing 5

```
/**
Creates a new database session to be used by this connection.
Connection and session properties set from OracleDataSource can
```

-continued

Listing 5

```
be overridden using this method. This method throws an
exception if a session is already used. The properties that are
provided as the argument will be stored in the connection
object and will be the one used if openSession( ) is called with
no arguments. This is a security requirement.
*/
public void openSession (Properties sessionProperties)
throws SQLException;
/**
Closes the attached database session. This is the equivalent
of logoff. The network link remains valid and the connection
can be reused by calling openSession(...).
*/
public void closeSession( ) throws SQLException;
/**
Returns the state of the connection. The state can be
"attached", "detached" or "aborted".
*/
public enum getState( );
```

In accordance with an embodiment, any call other than ping( ), close( ) or openSession( . . . ) on a No Session connection can throw an exception. The close( ) method on OracleConnection can be used to close/disconnect a detached no-session connection.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing a second-level connection cache for use with a database environment, comprising:

a computer including a processor and a database;

an application server, wherein the application server includes a data source, wherein the data source is associated with a first-level data source connection cache, wherein the first-level data source connection cache includes at least one first-level database connection object, and wherein each first-level database connection object is attached to a session of the database;

a second-level connection cache, which caches a plurality of no-session connection objects, wherein each no-session connection object includes a socket to the database together with network protocol information, and wherein each no-session connection is unattached to any session of the database;

wherein, the data source receives a request for a connection from the software application;

wherein, if there is an idle first-level database connection object in the first-level database connection cache, then the data source returns the idle first-level database connection object to the software application in response to the request;

wherein, if each first-level database connection object in the first-level database connection cache is not idle and there is an idle no-session connection object in the second-level cache, then the system attaches a session of the database to the idle no-session connection object to form a complete connection object and returns the complete connection object to the software application in response to the request; and wherein, if each first-level database connection object in the first-level database connection cache is not idle and each no-session connection object in the second-level cache is not idle, then the system creates an un-cached connection object and attaches a session of the database to the un-cached connection object to form a new un-cached connection object and returns the new un-cached connection object to the software application in response to the request.

2. The system of claim 1, wherein the first-level data source connection cache and the second-level connection cache are Universal Connection Pools (UCP) that provides access to the database using JDBC.

3. The system of claim 1, wherein the complete database connection object is closed by first attempting to store it in the data source connection cache, and if there is no available space in the data source connection cache, then the complete database connection object is detached from its attached database session, and then stored in the second-level connection cache.

4. The system of claim 1, wherein the data source connection cache and the second-level connection cache are of static sizes.

5. The system of claim 1, wherein the database environment is within a multi-tenant cloud environment.

6. The system of claim 1, wherein the data source connection cache and second-level connection cache are contained and managed by a single, global connection pool.

7. A method for providing a connection cache for use with a database environment, comprising:
providing an application server, wherein the application server includes a data source, wherein the data source is associated with a first-level data source connection cache, wherein the first-level data source connection cache includes at least one first-level database connection object, and wherein each first-level database connection object is attached to a session of the database;
providing a second-level connection cache, which caches a plurality of no-session connection objects, wherein each no-session connection object includes a socket to the database together with network protocol information, and wherein each no-session connection is unattached to any session of the database;

if there is an idle first-level database connection object in the first-level database connection cache, then returning, by the data source, the idle first-level database connection object to the software application;

if each first-level database connection object in the first-level database connection cache is not idle and there is an idle no-session connection object in the second-level cache, then attaching, by the system, a session of the database to the idle no-session connection object to form a complete connection object and returning the complete connection object to the software application; and if each first-level database connection object in the first-level database connection cache is not idle and each no-session connection object in the second-level cache is not idle, then creating, by system, an un-cached connection object and attaching a session of the database to the un-cached connection object to form a new un-cached connection object and returning the new un-cached connection object to the software application.

8. The method of claim 7, wherein the data source connection cache and the second-level connection cache are Universal Connection Pools (UCP) that provides access to the database using JDBC.

9. The method of claim 7, wherein the complete database connection object is closed by first attempting to store it in the data source connection cache, and if there is no available space in the data source connection cache, then the complete database connection object is detached from its attached database session, and then stored in the second-level connection cache.

10. The method of claim 7, wherein all the data source connection cache and the second-level connection cache are of static sizes.

11. The method of claim 7, wherein the database environment is within a multi-tenant cloud environment.

12. The method of claim 7, wherein the data source connection cache and second-level connection cache are contained and managed by a single, global connection pool.

13. A non-transitory computer readable storage medium, including instructions stored thereon which when read and executed by one or more computers cause the one or more computers to perform the steps comprising:
providing an application server, wherein the application server includes a data source, wherein the data source is associated with a first-level data source connection cache, wherein the first-level data source connection cache includes at least one first-level database connection object, and wherein each first-level database connection object is attached to a session of the database;
providing a second-level connection cache, which caches a plurality of no-session connection objects, wherein each no-session connection object includes a socket to the database together with network protocol information, and wherein each no-session connection is unattached to any session of the database;

if there is an idle first-level database connection object in the first-level database connection cache, then returning, by the data source, the idle first-level database connection object to the software application;

if each first-level database connection object in the first-level database connection cache is not idle and there is an idle no-session connection object in the second-level cache, then attaching, by the system, a session of the database to the idle no-session connection object to form a complete connection object and returning the complete connection object to the software application; and if each first-level database connection object in the first-level database connection cache is not idle and each no-session connection object in the second-level cache is not idle, then creating, by system, an un-cached connection object and attaching a session of the database to the un-cached connection object to form a new un-cached connection object and returning the new un-cached connection object to the software application.

\* \* \* \* \*

UNITED STATES PATENT AND TRADEMARK OFFICE
CERTIFICATE OF CORRECTION

| | | |
|---|---|---|
| PATENT NO. | : 9,569,472 B2 | Page 1 of 1 |
| APPLICATION NO. | : 14/253580 | |
| DATED | : February 14, 2017 | |
| INVENTOR(S) | : Hegde et al. | |

It is certified that error appears in the above-identified patent and that said Letters Patent is hereby corrected as shown below:

In the Specification

In Column 1, Line 30, delete "2014, 2014;" and insert -- 2014; --, therefor.

In Column 1, Line 32, before "FRAGMENTED" delete "FRAGMENTS".

In Column 1, Line 34, delete "2014, 2014;" and insert -- 2014; --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*